US008072881B2

(12) United States Patent  
Croak et al.

(10) Patent No.: US 8,072,881 B2
(45) Date of Patent: *Dec. 6, 2011

(54) METHOD AND APPARATUS FOR CONTROLLING CALL VOLUME IN A PACKET NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 141 days.

This patent is subject to a terminal disclaimer.

(21) Appl. No.: 12/553,712

(22) Filed: Sep. 3, 2009

(65) Prior Publication Data

US 2011/0051600 A1  Mar. 3, 2011

Related U.S. Application Data

(63) Continuation of application No. 11/320,285, filed on Dec. 28, 2005, now Pat. No. 7,593,325.

(51) Int. Cl.
*H04L 12/26* (2006.01)

(52) U.S. Cl. ........................................ 370/229; 370/252
(58) Field of Classification Search .................. 370/229, 370/252
See application file for complete search history.

(56) References Cited

U.S. PATENT DOCUMENTS

| 6,445,697 | B1* | 9/2002 | Fenton | 370/357 |
| 7,593,325 | B1* | 9/2009 | Croak et al. | 370/229 |
| 2004/0254796 | A1* | 12/2004 | Lehtimaki | 704/500 |
| 2007/0147240 | A1* | 6/2007 | Benveniste | 370/230 |
| 2008/0013544 | A1* | 1/2008 | Ginde et al. | 370/395.21 |

* cited by examiner

*Primary Examiner* — Melvin Marcelo

(57) ABSTRACT

Method and apparatus for controlling call volume in a packet-switched network is described. In one example, a number of concurrent calls per codec of a plurality of codecs is monitored. A concurrent call limit for each of the plurality of codecs is obtained. For each codec of the plurality of codecs, an indication is generated for each call causing the number of concurrent calls for the codec to exceed the concurrent call limit for the codec. In response to the indication, the call may be blocked or an alternative codec may be selected for the call.

20 Claims, 4 Drawing Sheets

300

METHOD AND APPARATUS FOR CONTROLLING CALL VOLUME IN A PACKET NETWORK

REFERENCE TO RELATED APPLICATIONS

This application is a continuation of U.S. patent application Ser. No. 11/320,285, filed Dec. 28, 2005, now U.S. Pat. No. 7,593,325, issued Sep. 22, 2009, which is herein incorporated by reference in its entirety.

BACKGROUND OF THE INVENTION

1. Field of the Invention

Embodiments of the present invention generally relate to telecommunications systems and, more particularly, to a method and apparatus for controlling call volume in a packet network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VOIP) network.

VOIP network providers often provide support for multiple coder-decoders (codecs). Codecs are used to code and decode media data (e.g., voice) communicated during a call among endpoints. Multiple codec support in a VOIP network accommodates the needs of an array of customer segments, from wholesale customers to enterprise customers to individual consumers. However, engineering network elements to meet the requirements of these codecs can be problematic. Notably, calls using some codecs consume more bandwidth and network resources than calls using other codecs. Too many calls using high-bandwidth codecs can decrease performance of the VOIP network. Accordingly, there exists a need in the art for an improved method and apparatus for controlling call volume in a packet network.

SUMMARY OF THE INVENTION

Method and apparatus for controlling call volume in a packet-switched network is described. In one embodiment, a number of concurrent calls per codec of a plurality of codecs is monitored. A concurrent call limit for each of the plurality of codecs is obtained. For each codec of the plurality of codecs, an indication is generated for each call causing the number of concurrent calls for the codec to exceed the concurrent call limit for the codec. In response to the indication, the call may be blocked or an alternative codec may be selected for the call.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
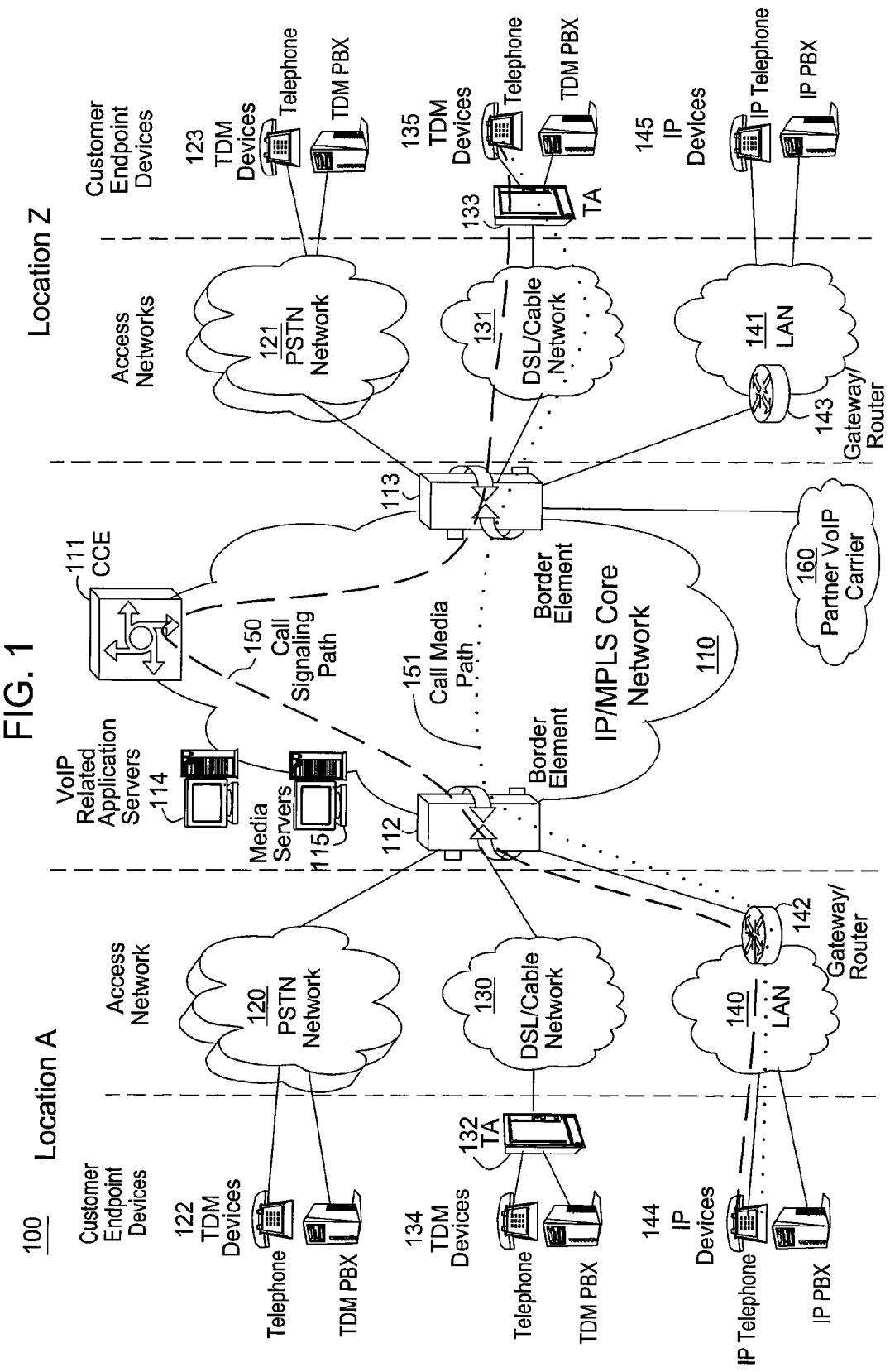
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

Referring to FIG. 1, the customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
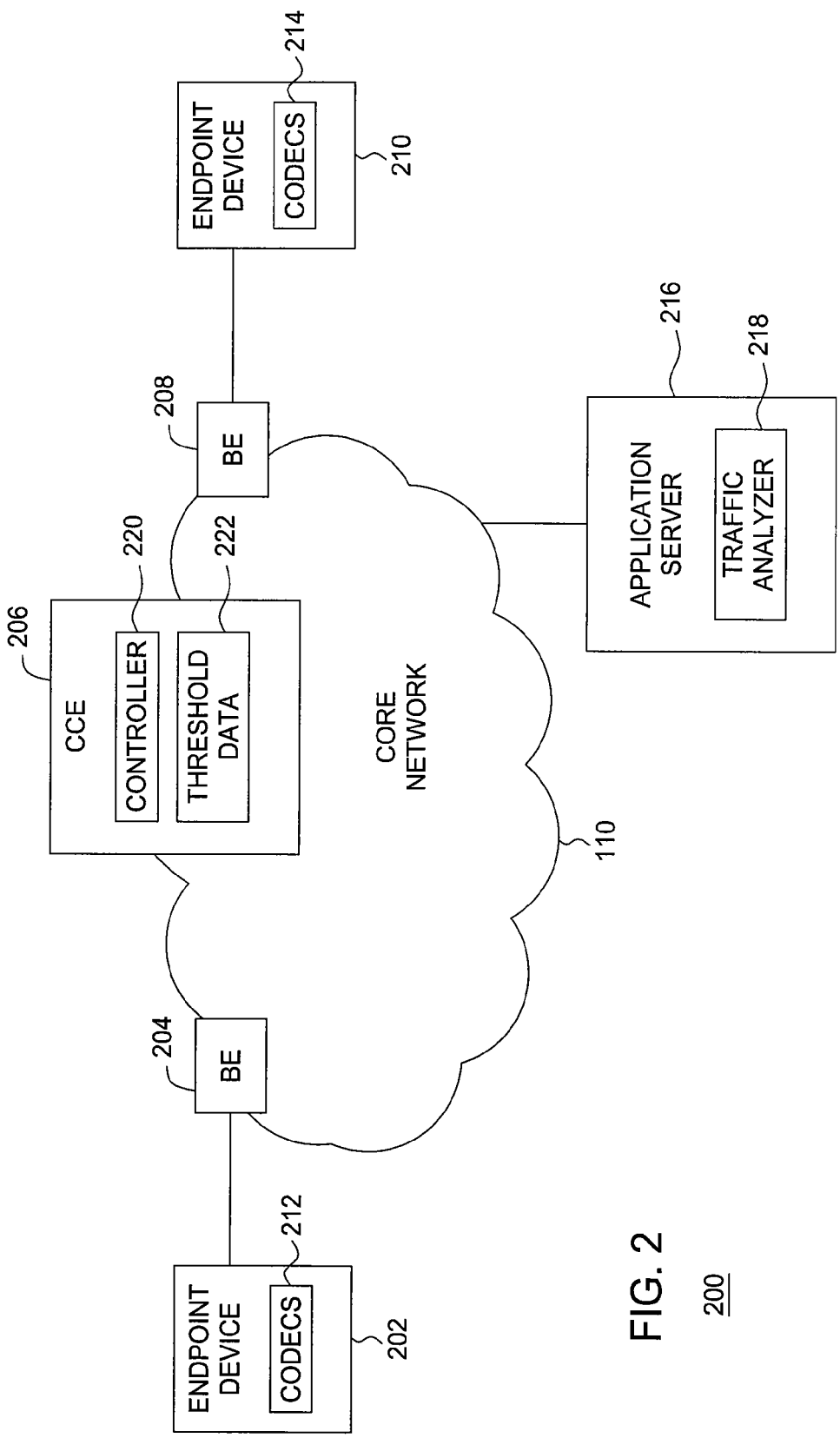
FIG. 2 is a block diagram depicting an exemplary embodiment of a portion of the communication system of FIG. 1 in accordance with one or more aspects of the invention.

FIG. 2 is a block diagram depicting an exemplary embodiment of a portion 200 of the communication system 100 of FIG. 1 in accordance with one or more aspects of the invention. In the portion 200, the core network 110 includes a BE 204, a CCE 206, a BE 208, and an application server 216. An endpoint device 202 is coupled to the BE 204. An endpoint device 210 is coupled to the BE 208. Each of the endpoint devices 202 and 210 is coupled to the core network 110 using any of the various access networks described above.

The endpoint device 202 includes a plurality of codecs 212 for processing media streams originated or received therein. Likewise, the endpoint device 210 includes a plurality of codecs 214. For example, a call established between the endpoint device 202 and the endpoint device 214 may include one or more media streams, such as audio stream(s) (e.g., voice stream), video streams(s), and/or data stream(s). The codecs 212 and 214 are used to code the media stream(s) for transmission through the core network 110, and to decode the media stream(s) upon receipt from the core network 110. The codecs 212 and 214 may include any type of codecs known in the art for processing audio, video, and/or data. The codecs 212 and 214 may be compressing codecs (i.e., the data is compressed before transmission and uncompressed upon receipt) or non-compressing codecs. The codecs 212 and 214 may be lossless codecs (i.e., none of the source data is lost during coding) or lossy codecs (i.e., some of the data is lost during coding). Exemplary audio codecs include audio interchange file format (AIFF), moving pictures expert group (MPEG) audio layer 3 (MP3), Windows Media Audio (WMA), and the like. Exemplary voice codecs include G.711, G.722.1, G.723.1, G.729a, and the like. Exemplary video codecs include MPEG-4, H.264, and the like.

Some codecs require more bandwidth in the core network 110 than other codecs. In particular, lossless codecs require more bandwidth than lossy codecs. For example, most calls handled by the core network 110 may include a voice stream. If a G.711 codec is used to code the voice stream, the core network 110 must allocate more bandwidth to the call than if a G.723.1 codec was used, for example. In accordance with one embodiment of the invention, the core network 110 employs concurrent call limits on a per codec basis.

In one embodiment, the CCE 206 includes a controller 220. The CCE 206 is configured with threshold data 222. The threshold data 222 includes concurrent call limits for each of a plurality of codecs. A concurrent call limit is a maximum number of allowable calls at a time. The controller 220 is configured to monitor numbers of concurrent calls processed by the CCE 206 for various codecs. If, for any codec, a call causes the number of concurrent calls for that codec to exceed the concurrent call limit for that codec, the controller 220 generates an indication. In response to each indication, the CCE 106 may block the call that generated the indication. Alternatively, in response to each indication, the CCE 106 may signal selection of an alternative codec for the call that generated the indication.

Operation of the invention may be understood with reference to the following example. Assume the endpoint device 202 is the originator of a voice call destined for the endpoint device 210. Assume further that SIP signaling is used for call setup. The endpoint device 202 sends a SIP-INVITE to the BE 204. The SIP-INVITE includes an attribute indicating the desired codec. For example, the SIP-INVITE message may act as a carrier for a session description protocol (SDP) message that describes the media content of the call, including what codec is to be used. Assume the endpoint device 202 selects a G.711 codec for the call. The BE 204 sends a SIP-INVITE message to the CCE 206.

The CCE 206 processes the SIP-INVITE message to identify the codec to be used for the call. The controller 220 has hitherto been monitoring a number of concurrent calls per codec of a plurality of codecs. The controller 220 determines whether the call will cause the number of concurrent calls for the identified codec to exceed the concurrent call limit for that codec. If not, the CCE 206 sends a SIP-INVITE message to the BE 208 and nominal call processing continues, as described above. Otherwise, the controller 220 generates an indication that the requested call exceeds a concurrent call limit for the identified codec.

In one embodiment, the CCE 206 may block the call in response to the indication. In another embodiment, the CCE 206 may send a SIP signaling message to the BE 204 indicating that an alternative codec must be selected in order to complete the call. The BE 204 in turn forwards the SIP signaling message to the endpoint device 202, which may select another codec for completing the call. The CCE 206 may provide a suggested codec to the endpoint device 202. The suggested codec may be based on the numbers of concurrent calls currently established for the codecs as compared to the respective concurrent call limits.

In another example, the SIP-INVITE message generated by the endpoint device 202 may include a list of desired codecs in order of desirability (e.g., the list may include a first desired codec, followed by one or more alternative codecs). If the controller 220 generates an indication that the call would cause the number of concurrent calls to exceed the corresponding call limit for the first codec in the list, the CCE 206 may select the next codec in the list for the call. The controller 220 then determines whether the call will cause the number of concurrent calls for the next codec to exceed the concurrent call limit for that codec. The process may proceed in this manner until a codec is selected where the call does not cause a concurrent call limit to be exceeded, or there are not more alternative codecs to select. If a codec is selected that does not cause a concurrent call limit to be exceeded, the CCE 206 sends a SIP-INVITE message to the BE 208 with the selected codec and call processing continues. Otherwise, the CCE 206 may block the call or send a SIP signaling message towards the endpoint device 202 indicating that an alternative codec must be selected. The CCE 206 may provide a suggested codec.

For purposes of clarity by example, aspects of the invention have been described with respect to SIP signaling. It is to be understood that other types of signaling may be employed. In general, the endpoint device 202 signals a call request to the network 110 that includes one or more requested codecs. In the embodiments described above, the CCE 206 is configured with the controller 220 and the threshold data 222. Those skilled in the art will appreciate that the controller 220 and the threshold data 222 may be configured in other types of network elements that process calls in the core network 110, such as border elements (e.g., BEs 204 and 208). In addition, in the embodiments described above, the call included only a voice stream. Those skilled in the art will appreciate that the call may include other types of media streams. Processing proceeds as described above, but with other types of codecs.

In the embodiments described above, the endpoint device 202 selects one or more codecs for the call. In another embodiment, the setup signaling message sent by endpoint device 202 does not include selected codec(s). Rather, the network 110 is configured to select a codec for the call. For example, upon receiving the setup signaling message from the endpoint device 202, the BE 204 forwards the message to the CCE 206. The CCE 206 selects one or more codecs for the call. The controller 220 has hitherto been monitoring a number of concurrent calls per codec of a plurality of codecs. The controller 220 generates an indication for each codec where the call will cause the concurrent call limit for that codec to be exceeded. In this manner, the CCE 206 formulates a list of one or more allowable codecs to be used by the call. In one embodiment, the CCE 206 sends a signaling message to the BE 204 with the list of allowable codec(s), which forwards the message to the endpoint device 202. If the list of codec(s) is satisfactory to the endpoint device 202, then call processing proceeds. In another embodiment, the CCE 206 may just proceeds with call processing without seeking authorization from the endpoint device 202. Again, while this example has been described with respect to the CCE 206, those skilled in the art will appreciate that this functionality may be employed by other network elements, such as BEs.

In one embodiment, the concurrent call limit for at least one of the plurality of codecs in the threshold data 222 is adjusted in response to measures of traffic volume. For example, the application server 216 may be configured with a traffic analyzer 218. The traffic analyzer 218 is configured to generate measures of traffic volume in the network 110 over time. The controller 220 may obtain these measures of traffic volume from the application server 216. The concurrent call limits may be dynamically adjusted as a function of the traffic volume measures. For example, if traffic volume is high, concurrent call limits for lossless codecs may be decreased to conserve bandwidth. This decreasing of concurrent call limits may be paired with an increase in concurrent call limits for lossy codecs. Conversely, if traffic volume is low, concurrent call limits for lossless codecs may be increased. While the traffic analyzer 218 is implemented by the application server 216, it is to be understood that the traffic analyzer 218 may be implemented in other network elements, such as CCEs (e.g., the CCE 206), BEs (e.g., BEs 204 and 208), and the like.

Figure 3:
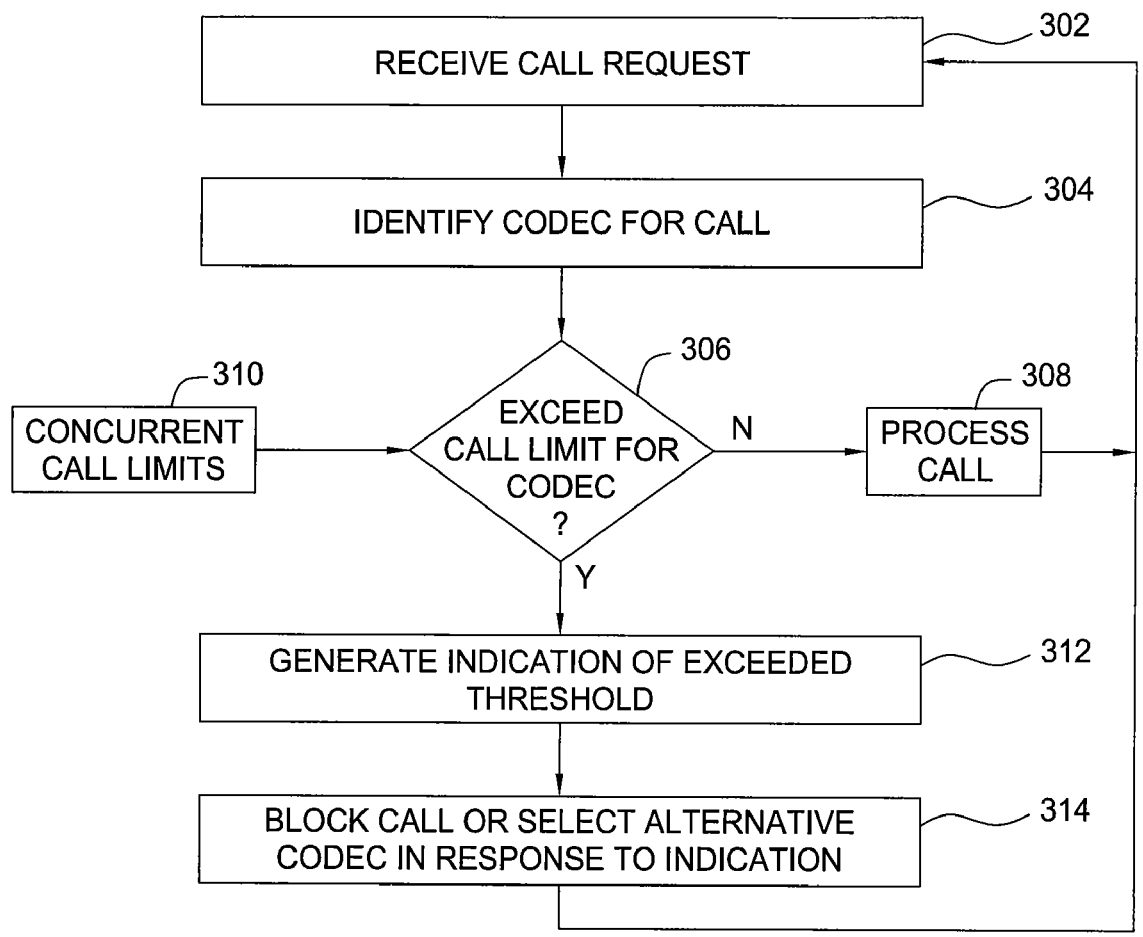
FIG. 3 is a flow diagram depicting an exemplary embodiment of a method for controlling call volume in a packet network in accordance with one or more aspects of the invention.

FIG. 3 is a flow diagram depicting an exemplary embodiment of a method 300 for controlling call volume in a packet network in accordance with one or more aspects of the invention. The method 300 begins at step 302, where a call request is received. At step 304, a codec is identified for the call. In one embodiment, the originating endpoint of the call provides one or more potential codecs for the call. Alternatively, a network element in the network may provide one or more potential codecs. If multiple potential codecs are specified, one of them is identified at step 304. At step 306, a determination is made whether the call would cause the concurrent call limit for the identified codec to be exceeded. Concurrent call limits for various codecs are obtained at step 310. If not, the method 300 proceeds to step 308, where the call is processed using the identified codec. The method 300 returns to step 302 and repeats for another call request.

If the call would cause the concurrent call limit to be exceeded at step 306, the method 300 proceeds to step 312. At step 312, an indication of that a concurrent call limit has been exceeded is generated. At step 314, the call is blocked or an alternative codec is selected for the call in response to the indication. The alternative codec may be selected by the network, or the network may signal the originating endpoint to select another codec. The method 300 returns to step 302 and repeats for another call.

Figure 4:
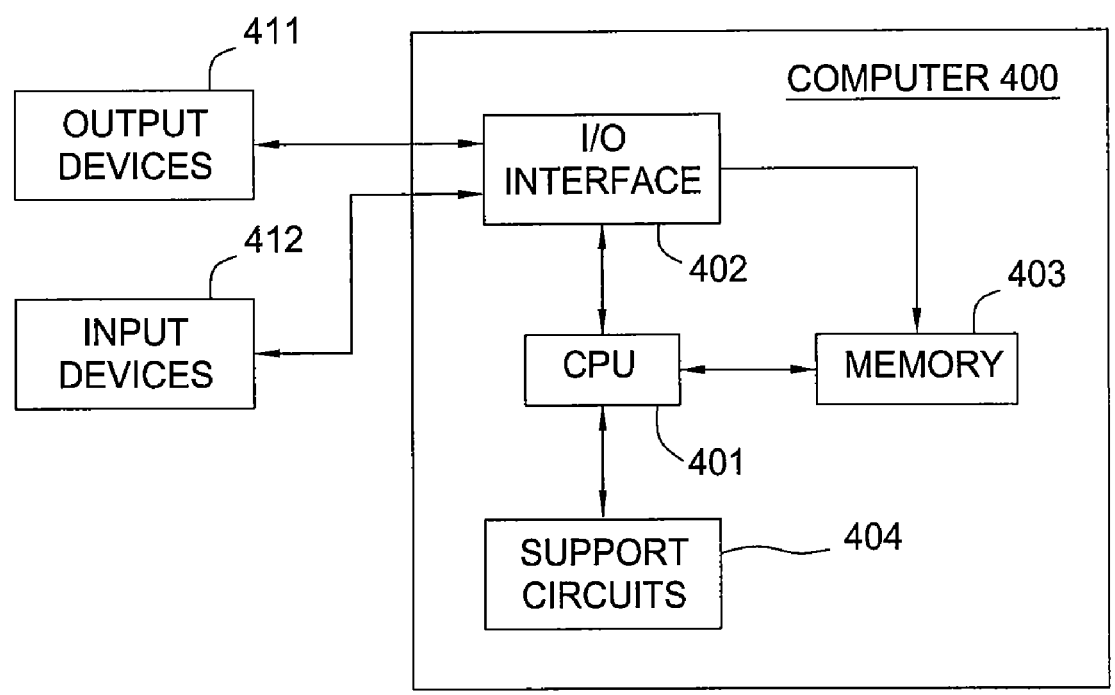
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. The computer 400 includes a central processing unit (CPU) 401, a memory 403, various support circuits 404, and an I/O interface 402. The CPU 401 may be any type of microprocessor known in the art. The support circuits 404 for the CPU 401 include conventional cache, power supplies, clock circuits, data registers, I/O interfaces, and the like. The I/O interface 402 may be directly coupled to the memory 403 or coupled through the CPU 401. The I/O interface 402 may be coupled to various input devices 412 and output devices 411, such as a conventional keyboard, mouse, printer, and the like.

The memory 403 may store all or portions of one or more programs and/or data to implement the processes and methods described herein. Notably, the memory 403 may store program code to be executed by the CPU 401 for performing the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method for controlling call volume in a packet network, comprising:
   monitoring a number of concurrent calls for a codec;
   obtaining a concurrent call limit for the codec;
   generating an indication for each call causing the number of concurrent calls for the codec to exceed the concurrent call limit for the codec; and
   sending, in response to the indication, a signal to an endpoint device to select an alternative codec.

2. The method of claim 1, further comprising:
   obtaining measures of traffic volume over time; and
   adjusting the concurrent call limit for the codec in response to each of the measures of traffic volume.

3. The method of claim 2, wherein, for each measure of traffic volume of the measures of traffic volume, the concurrent call limit for the codec is decreased, if the measure of traffic volume is more than a previous measure of traffic volume.

4. The method of claim 1, wherein the codec comprises a lossless codec.

5. The method of claim 1, wherein the packet network comprises an internet protocol network.

6. The method of claim 1, wherein the codec comprises a lossy codec.

7. The method of claim 5, wherein the internet protocol network comprises a voice over internet protocol network.

8. The method of claim 5, wherein the internet protocol network comprises a service over internet protocol network.

9. An apparatus for controlling call volume in a packet network, comprising:
   means for monitoring a number of concurrent calls for a codec;
   means for obtaining a concurrent call limit for the codec;
   means for generating an indication for each call causing the number of concurrent calls for the codec to exceed the concurrent call limit for the codec; and
   means for sending, in response to the indication, a signal to an endpoint device to select an alternative codec.

10. The apparatus of claim 9, further comprising:
    means for obtaining measures of traffic volume over time; and
    means for adjusting the concurrent call limit for the codec in response to each of the measures of traffic volume.

11. The apparatus of claim 10, wherein, for each measure of traffic volume of the measures of traffic volume, the concurrent call limit for the codec is decreased, if the measure of traffic volume is more than a previous measure of traffic volume.

12. The apparatus of claim 9, wherein the codec comprises a lossless codec.

13. The apparatus of claim 9, wherein the packet network comprises an Internet protocol network.

14. The apparatus of claim 9, wherein the codec comprises a lossy codec.

15. A computer readable storage medium having stored thereon instructions that, when executed by a processor, cause the processor to perform a method for controlling call volume in a packet network, comprising:
    monitoring a number of concurrent calls for a codec;
    obtaining a concurrent call limit for the codec;

generating an indication for each call causing the number of concurrent calls for the codec to exceed the concurrent call limit for the codec; and sending, in response to the indication, a signal to an endpoint device to select an alternative codec.

16. The computer readable storage medium of claim 15, further comprising:

obtaining measures of traffic volume over time; and adjusting the concurrent call limit for the codec in response to each of the measures of traffic volume.

17. The computer readable storage medium of claim 16, wherein, for each measure of traffic volume of the measures of traffic volume, the concurrent call limit for the codec is decreased, if the measure of traffic volume is more than a previous measure of traffic volume.

18. The computer readable storage medium of claim 15, wherein the packet network comprises an internet protocol network.

19. The computer readable storage medium of claim 15, wherein the codec comprises a lossy codec.

20. The computer readable storage medium of claim 15, wherein the codec comprises a lossless codec.

* * * * *